United States Patent
Lüssi

(10) Patent No.: US 8,528,464 B2
(45) Date of Patent: Sep. 10, 2013

(54) BREWING FACILITY FOR A COFFEE MACHINE

(75) Inventor: André Lüssi, Jegenstorf (CH)

(73) Assignee: Schaerer AG, Zuchwill (CH)

( * ) Notice: Subject to any disclaimer, the term of this patent is extended or adjusted under 35 U.S.C. 154(b) by 407 days.

(21) Appl. No.: 12/922,931

(22) PCT Filed: Mar. 12, 2009

(86) PCT No.: PCT/EP2009/052903
§ 371 (c)(1),
(2), (4) Date: Sep. 16, 2010

(87) PCT Pub. No.: WO2009/118246
PCT Pub. Date: Oct. 1, 2009

(65) Prior Publication Data
US 2011/0011272 A1  Jan. 20, 2011

(30) Foreign Application Priority Data
Mar. 27, 2008 (EP) .................................... 08153418

(51) Int. Cl.
*A47J 31/00* (2006.01)
(52) U.S. Cl.
USPC ............................................. 99/279; 99/282
(58) Field of Classification Search
USPC ................... 99/289 R, 282, 302 C, 287, 297, 99/302 R, 416; 426/433
See application file for complete search history.

(56) References Cited

U.S. PATENT DOCUMENTS 5,333,537 A * 8/1994 Lussi et al. ....................... 99/287
6,101,924 A * 8/2000 Blankenship et al. ........... 99/299

FOREIGN PATENT DOCUMENTS
EP 0528758 A  2/1993

OTHER PUBLICATIONS
International Search Report dated May 26, 2009.

* cited by examiner

*Primary Examiner* — Sang Paik
*Assistant Examiner* — Renee L Miller
(74) *Attorney, Agent, or Firm* — Pearne & Gordon LLP

(57) ABSTRACT

A brewing facility for a coffee machine comprises a brewing cylinder (6) and an upper plunger (3) and a lower plunger (4) by means of which a brewing chamber is formed. The brewing cylinder (6) and the plungers (3 and 4) are held in a frame (2) such that they can be shifted, and can be driven by means of a driving facility. For adding the coffee powder, a coffee powder feed facility is provided which in turn is provided with a swivel-type funnel (14), which can be moved against a spring force from a filling position into a swiveled-away position, and vice versa. The swivel-type funnel (14) can be swiveled further from the swiveled-away position to a fully swiveled-out position and, in said fully swiveled-out position, can be locked by locking means (29) and unlocked by unlocking means (30). In this way, the swivel-type funnel (14) can be held in the fully swiveled-out position during the cleaning of, in particular, the upper plunger (3).

7 Claims, 9 Drawing Sheets

BREWING FACILITY FOR A COFFEE MACHINE

The present invention relates to a brewing facility for a coffee machine, comprising a brewing cylinder with a cylindrical bore hole and an upper plunger and a lower plunger by means of which the brewing cylinder can be sealed to form a brewing chamber, whereby the brewing cylinder and the plungers are held in a frame such that they can be shifted with respect to each other, and can be driven by means of a driving facility, which driving facility comprises a spindle whose ends on either side are supported in the frame such that they can rotate, and a motor, a catching part that is attached on the brewing cylinder and is provided with a threaded part and, by means of the spindle, can be shifted along linear guidances that are attached in the frame, a coffee powder feed facility for filling coffee powder into the brewing chamber, which brewing chamber is provided with a swivel-type funnel, which can be moved against a spring force from a filling position into a swiveled-away position and vice versa, and a stripping element for stripping off the coffee powder cake, which is ejected from the brewing chamber by the lower plunger after the brewing process, into a collecting container.

Numerous brewing facilities of this type are known and are used both in household coffee machines and in restaurant coffee machines. In order to obtain a coffee, the requisite amount of, usually, freshly ground coffee powder, depending on which type of coffee is to be obtained, such as, commonly, coffee, espresso coffee, ristretto coffee, etc., is filled into the brewing chamber. Subsequently, the brewing chamber is closed and then hot water of the desired pressure is guided through the brewing chamber with coffee being brewed in the process. The coffee that is freshly brewed as described then proceeds through an outlet into the vessel provided. Subsequently, the brewing chamber is opened, the coffee powder residue present therein is ejected from the brewing chamber and proceeds into a container.

A brewing facility of this type is known, for example, from EP A 0528 758. In order to fill coffee powder into the brewing cylinder, said cylinder is moved to the filling position, i.e. it is made to be at a distance from the upper plunger, while the lower plunger inside the brewing cylinder resides in the lower position. In this position, the swivel-type funnel, which is held on the frame in the region of the upper plunger such that it can swivel, swivels into the free space between upper plunger and brewing cylinder; thereby the coffee powder that is added through the swivel-type funnel into the chamber that is formed by the brewing cylinder and the lower plunger. In order to seal the brewing chamber, the brewing chamber and the lower plunger jointly drive upwards until the upper plunger seals the brewing chamber. While it is being driven upwards, the swivel-type funnel is pressed back against the spring force by the brewing cylinder, by means of which the space for driving the brewing cylinder upwards is freed.

In this arrangement, said swivel-type funnel is always in a position, in which the upper plunger and, in particular, the screen of the plunger surface sealing the brewing chamber is covered and the accessibility for the purpose of cleaning said plunger surface is not optimal.

It is therefore the object of the present invention to design the brewing facility such that the upper plunger and, in particular, the plunger surface formed by the screen becomes optimally accessible.

Said object is met according to the invention in that the swivel-type plunger can be swiveled further from the swiveled-away position to a fully swiveled-out position and, in said fully swiveled-out position, can be locked by locking means and unlocked by unlocking means.

In said development, for cleaning of the upper plunger and, in particular, the screen forming the plunger surface sealing the brewing chamber during the coffee brewing process, the swivel-type plunger can be driven into a fully swiveled-out position, which optimizes the accessibility.

Advantageously, the locking means are formed by a cam that is attached on the swivel-type funnel and, with the swivel-type funnel being in the fully swiveled-out position, latches onto a recess that is attached on the frame and holds the swivel-type funnel in said fully swiveled-out position. The cam and the recess each can be formed onto the corresponding part during the parts fabrication, which renders production particularly simple.

Advantageously, the unlocking means are provided by a lever that is held on the frame such that it can swivel and has, on its swivel-type end-region, a projection attached to it that projects into the recess and, upon appropriate swiveling, pushes the cam out of the recess and unlocks the funnel. Aside from the structure of said unlocking means being quite simple, the swiveled-out funnel can be unlocked in an optimal manner.

Advantageously, a user element is attached on the lever and enables manual unlocking of the swiveled-out funnel in simple fashion.

Another advantageous development of the invention has a peripheral cam attached to the lever and interact with a control curve that is attached on the drivable region of the brewing cylinder and can be used to swivel the lever by means of the peripheral cam while driving up the brewing cylinder, and unlocks the fully swiveled-out funnel. This achieves automatic unlocking of the swiveled-out funnel prior to a brewing process being conducted.

Advantageously, the radial cam is provided in the form of a fin that is provided with a surface that is inclined with respect to the driving direction of the brewing cylinder, and which is attached on the stripping element. Said fin can easily be formed easily on the stripping element during the production thereof, ensuring reliable operation.

Advantageously, the cam is formed on an elastically malleable part of a wall of the swivel-type funnel such that no additional spring means are needed in order to press the cam into the recess during locking.

An embodiment of the invention shall be illustrated in more detail in the following in exemplary fashion based on the appended drawing.

Figure 1:
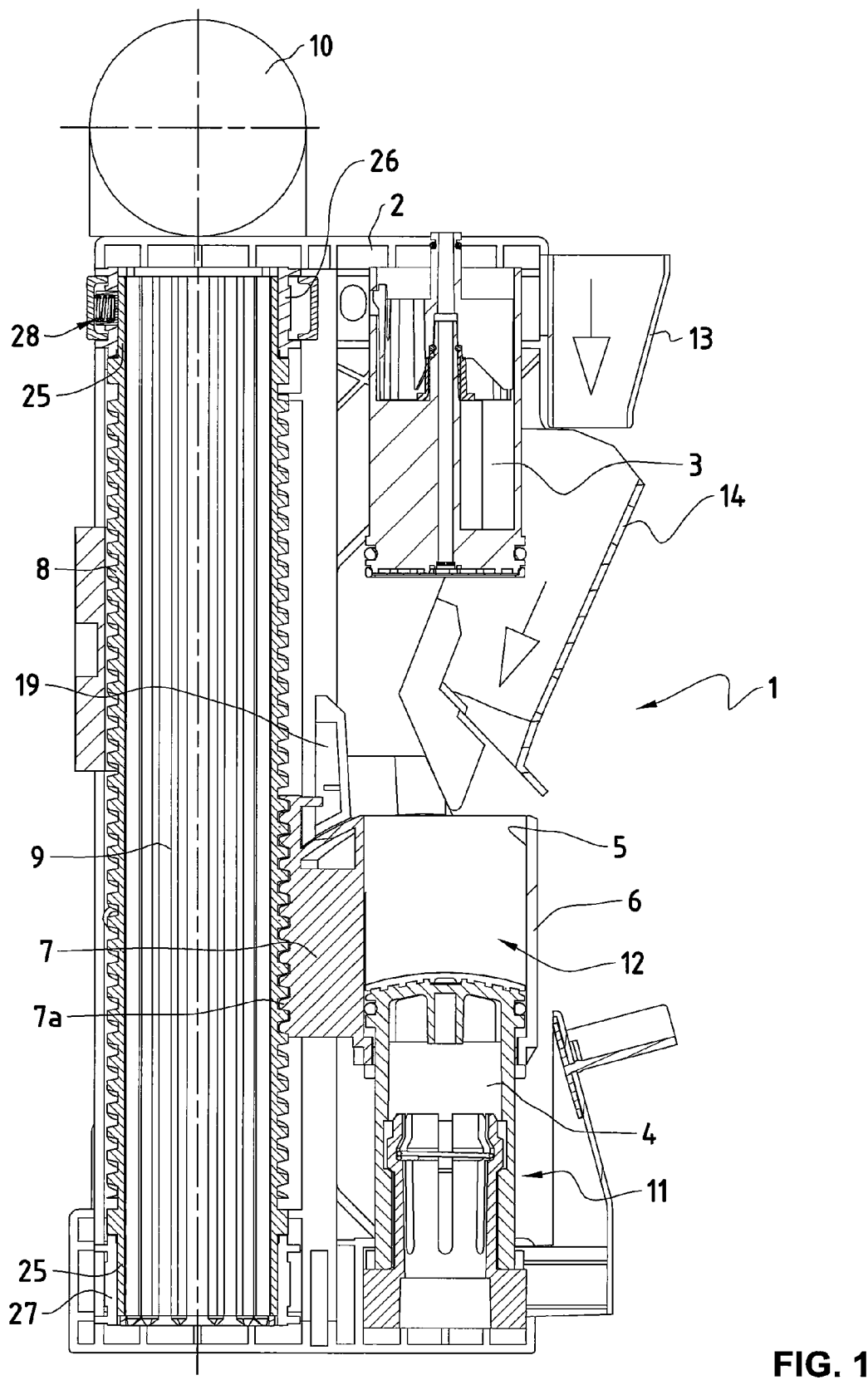
FIG. 1 shows a sectional view of a brewing facility of a coffee machine during the process of filling the coffee powder into the brewing chamber.

As is evident from FIGS. 1 to 4, the brewing facility 1 comprises an upper plunger 3 that is held fixed in place in the frame 2. A lower plunger 4 is arranged axially opposite from the upper plunger 3 and can be shifted axially with respect to the upper plunger 3. Said lower plunger 4 is held in a cylindrical bore hole 5 of a brewing cylinder 6, which brewing cylinder 6 can also be shifted axially. The brewing cylinder 6 is provided with a catching part 7 on which a threaded part 7*a* is attached that engages a thread 8 of a spindle 9 that is held in frame 2 such that it can rotate. Said spindle 9 comprises on its ends on either side one bearing pin 25 each that are held in bearing rings 26 and 27, which are attached in frame 2, such that they can rotate in a gliding manner. A bearing element 28 is inserted into the bearing ring 26 and eliminates the play between bearing pin 25 and bearing ring 26. The spindle 9 can be driven in known fashion by an electrical motor 10 which is also attached on the frame.

FIG. 1 shows the brewing facility 1 in the filling position. This means that the lower plunger 4 is in the lowest position, in which it is held by the latching facility 11 that is attached on the frame 2. The lower plunger 4 reached said position by the brewing cylinder 6 also having been brought to the lowest position by appropriate rotation of the spindle 9; the lower plunger 4 was taken along to said lowest position until it latched into the latching facility 11, then the brewing cylinder 6 was driven up again by appropriate rotation of the spindle 9, as is evident from FIG. 1. In this context, the lower plunger 4 remained in the lowest position, i.e. the brewing cylinder 6 was lifted with respect to the lower plunger 4, which generates on the inside of the brewing cylinder 6 the brewing chamber 12 that is sealed towards the bottom here by the lower plunger 4. In said filling position, the stripping element is in its resting position above the catching part 7.

At this time, the freshly ground coffee powder is added into the brewing chamber 12. Said coffee powder is ground in known fashion in a coffee grinder, which is not shown and is also accommodated in the corresponding coffee machine, then the powder proceeds via a first funnel 13 onto a swivel-type funnel 14 by means of which the ground coffee powder is guided into the brewing chamber 12. For this purpose, the swivel-type funnel 14, which is held on the frame 2 such that it can swivel as shall be described in more detail below, is in the swiveled-in filling position, meaning that the coffee powder added thus proceeds into the brewing chamber 12. The quantity of coffee powder guided-in is dosed in known fashion depending on which type of coffee is to be obtained.

Figure 2:
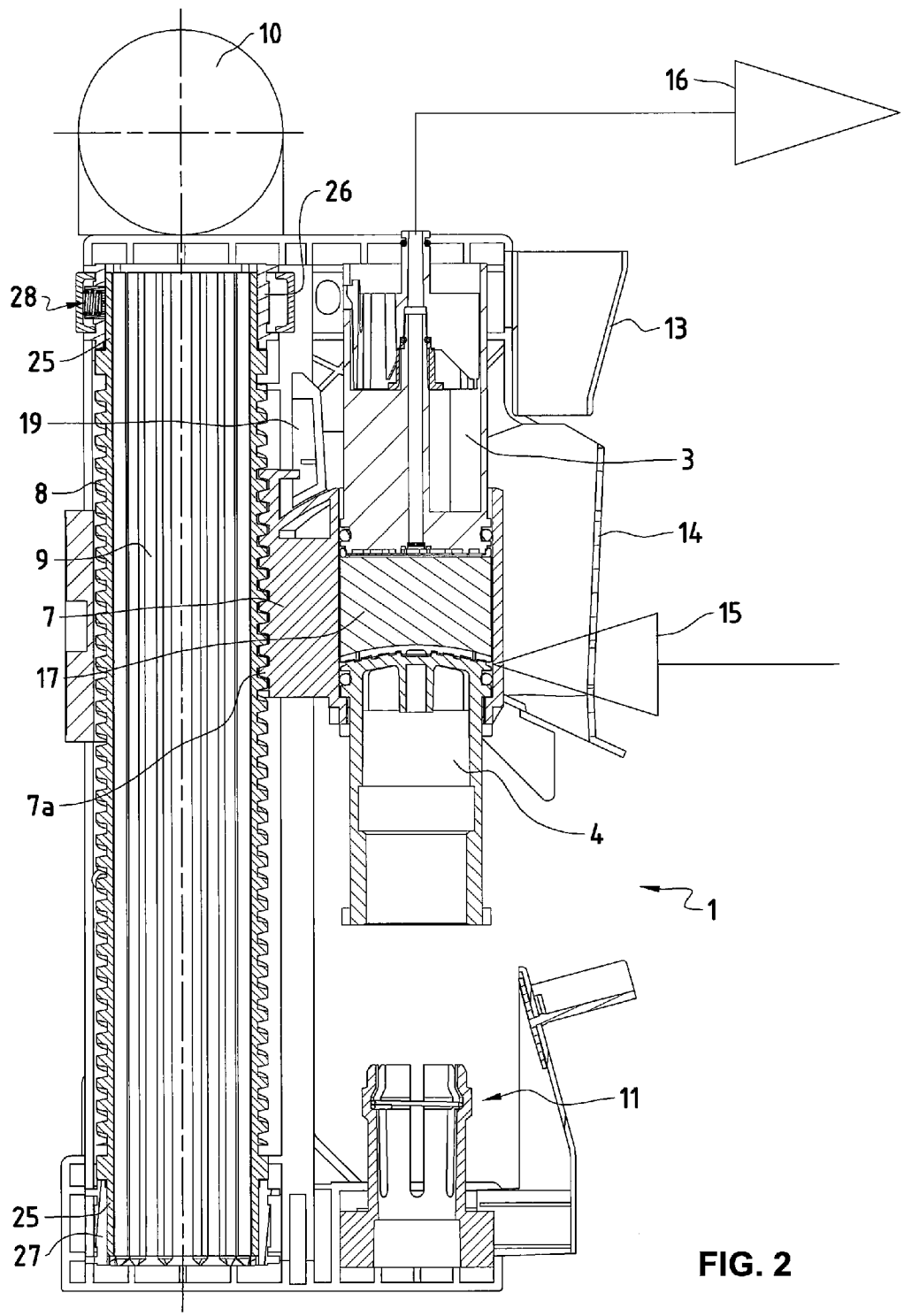
FIG. 2 shows a sectional view of the brewing facility with sealed brewing chamber being during the process of brewing a coffee.

After the freshly ground coffee powder is filled into the brewing chamber 12, the spindle 9 is made to rotate by the electrical motor 10 upon which the brewing cylinder 6 is driven upwards by the threaded part 7*a* on the catching part 7, whereby the lower plunger 4 is taken along by means of corresponding latches. The brewing cylinder 6 and the lower plunger 4 are driven upwards until the brewing chamber 12 is sealed by the upper plunger 3 and the coffee powder that is present in brewing chamber 12 is pressed together. The brewing position is reached in said position of the brewing cylinder 6, which is shown in FIG. 2. The hot water can then be guided into the brewing chamber 12 from below in known fashion, as is indicated by arrow 15, the hot water then flows through the brewing chamber 12 and the ground coffee powder that is present therein and is guided off as brewed coffee, as is indicated by arrow 16, by means of a drainage channel that is attached in the upper plunger 3 in known fashion, and reaches in known fashion, via a line that is not shown, a spout of the coffee machine and, from there, the vessel provided thereunder. In order to brew the coffee, the coffee powder that is present in the brewing chamber is compressed between the two plungers 3 and 4 such that it establishes a resistance to the brewing water flowing through it such that the brewing water needs to be pressed through the brewing chamber at a pressure of approx. 8 bar. The coffee powder that is present after the brewing process remains inside the brewing chamber 12 and forms a coffee powder cake that is very compact and wet.

As is evident from FIG. 2, upon the brewing cylinder 6 and the lower plunger 4 being driven upwards, the swivel-type funnel 14 is swiveled back from the filling position into a swiveled-away position which occurs against a spring force that acts on the swivel-type funnel 14 by pressing the swivel-type funnel 14 back into the position shown in FIG. 1. By swiveling-away the swivel-type funnel 14, the space between upper plunger 3 and brewing cylinder 6 is freed such that the brewing cylinder 6 does not collide with the swivel-type funnel 14 when it is driven upwards in order to seal the brewing chamber 12 with the upper plunger 3.

Figure 3:
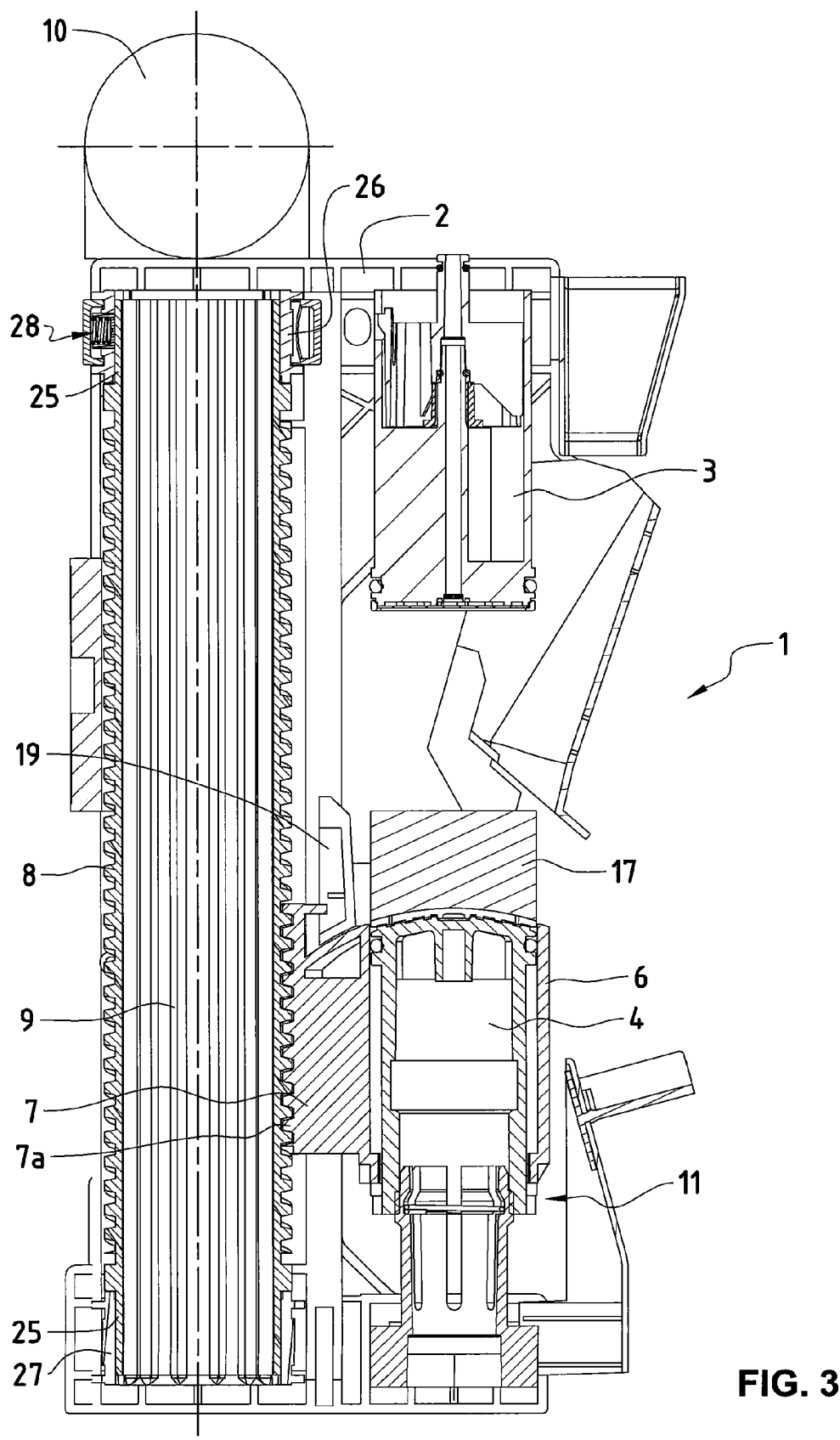
FIG. 3 shows a sectional view of the brewing facility with open brewing chamber and the coffee powder cake being ejected by the lower plunger.
Figure 4:
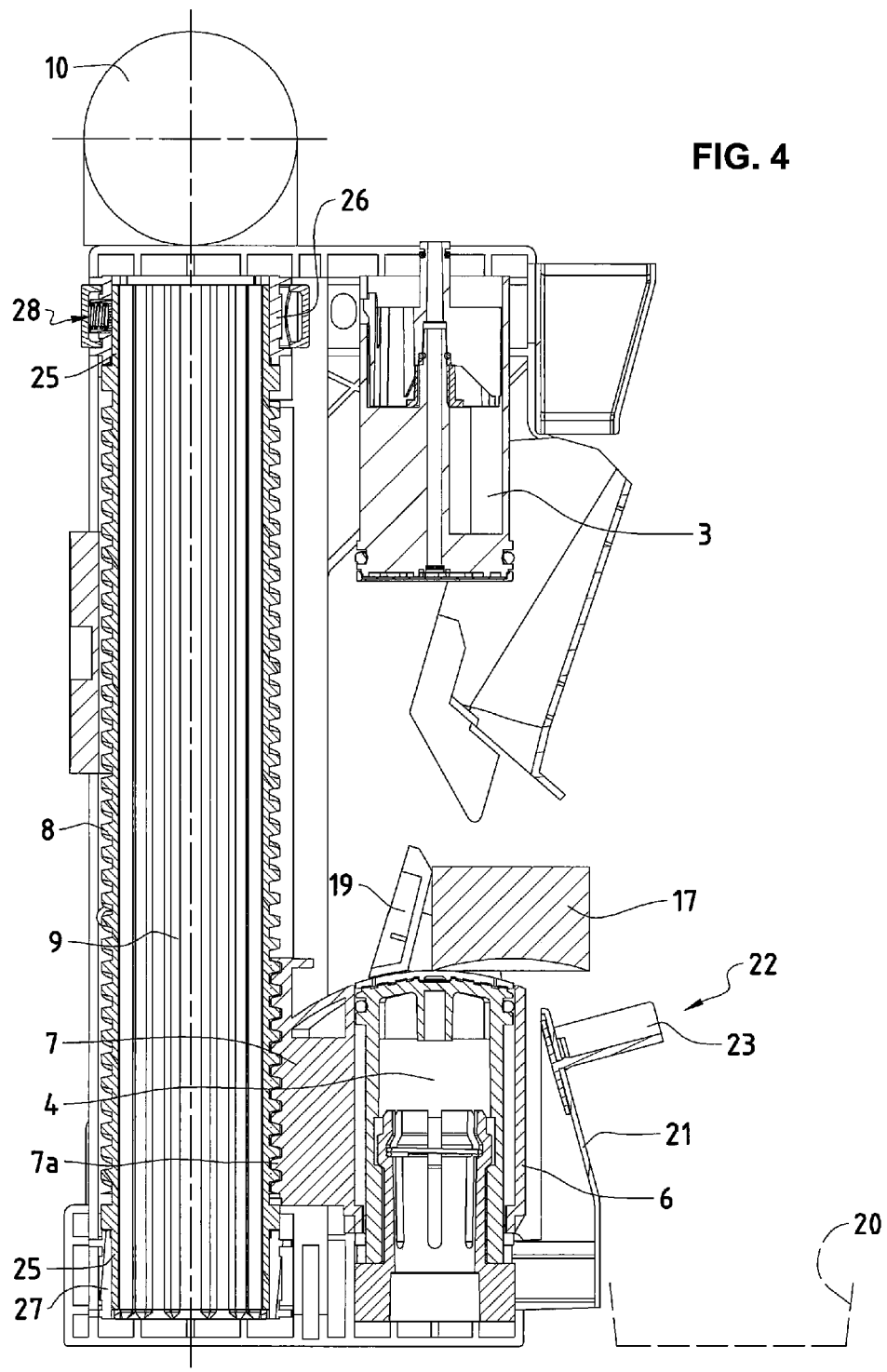
FIG. 4 shows a sectional view of the brewing facility at the onset of the coffee powder cake being stripped off by the stripping facility.

After the brewing process is completed, the brewing chamber 12 is opened by driving the brewing cylinder 6 and the lower plunger 4 downwards by appropriate rotation of the spindle 9, as is shown in FIG. 3. The lower plunger 4 thus reaches the latching facility 11 with its lower end and supports itself thereon. The brewing cylinder 6 is driven downwards further, while the lower plunger stops, by means of which the coffee powder cake 17 is ejected from the brewing cylinder 6, as is evident in FIG. 3. When the upper edge of the brewing cylinder 6 reaches the upper edge of the lower plunger 4, the ejected coffee powder cake 17 rests on the lower plunger 4, the lower plunger 4 is taken along by means of corresponding stops along with the brewing cylinder 6 that can be driven further downwards and the lower plunger 4 is driven into the latching facility 11, as is shown in FIG. 4. When the brewing cylinder 6 and the lower plunger 4 approach the lower position, the stripping element 19, which is hinged to the brewing cylinder 6 in known fashion, is mechanically actuated by means of a known motion link that is attached on the frame 2. By this means, the stripping element 19 moves across the lower plunger 4, the coffee powder cake 17 is stripped off the lower plunger 4 and the brewing cylinder 6, as is evident from FIG. 4.

In the process, the coffee powder cake 17 to be ejected proceeds via a slide 21 that is attached on the frame 2 into a container 20 that is accommodated in the coffee machine and is shown only schematically. A disintegration element 22 is attached on the slide 21 and provided in this exemplary embodiment in the form of blade 23 by means of which the coffee powder cake 17 proceeding via the slide 21 into the container 20 is cut into smaller pieces.

After ejection of the coffee powder cake 17, the brewing cylinder 6 can again be brought into the filling position by appropriate rotation of the spindle 9, as is shown in FIG. 1, upon which the brewing facility is ready for the brewing of another coffee.

After a certain number of coffees has been brewed, the brewing facility needs to be cleaned. For this purpose, the brewing facility can be taken out of the coffee machine in known fashion, which renders the cleaning process easy to conduct. As described above, the swivel-type funnel 14 is pressed by spring force into the swiveled-in filling position when the brewing chamber is in the open position such as is particularly evident in FIG. 1 and FIG. 4. Accordingly, said swivel-type funnel largely covers the upper plunger 3 that is to be cleaned.

Figure 5:
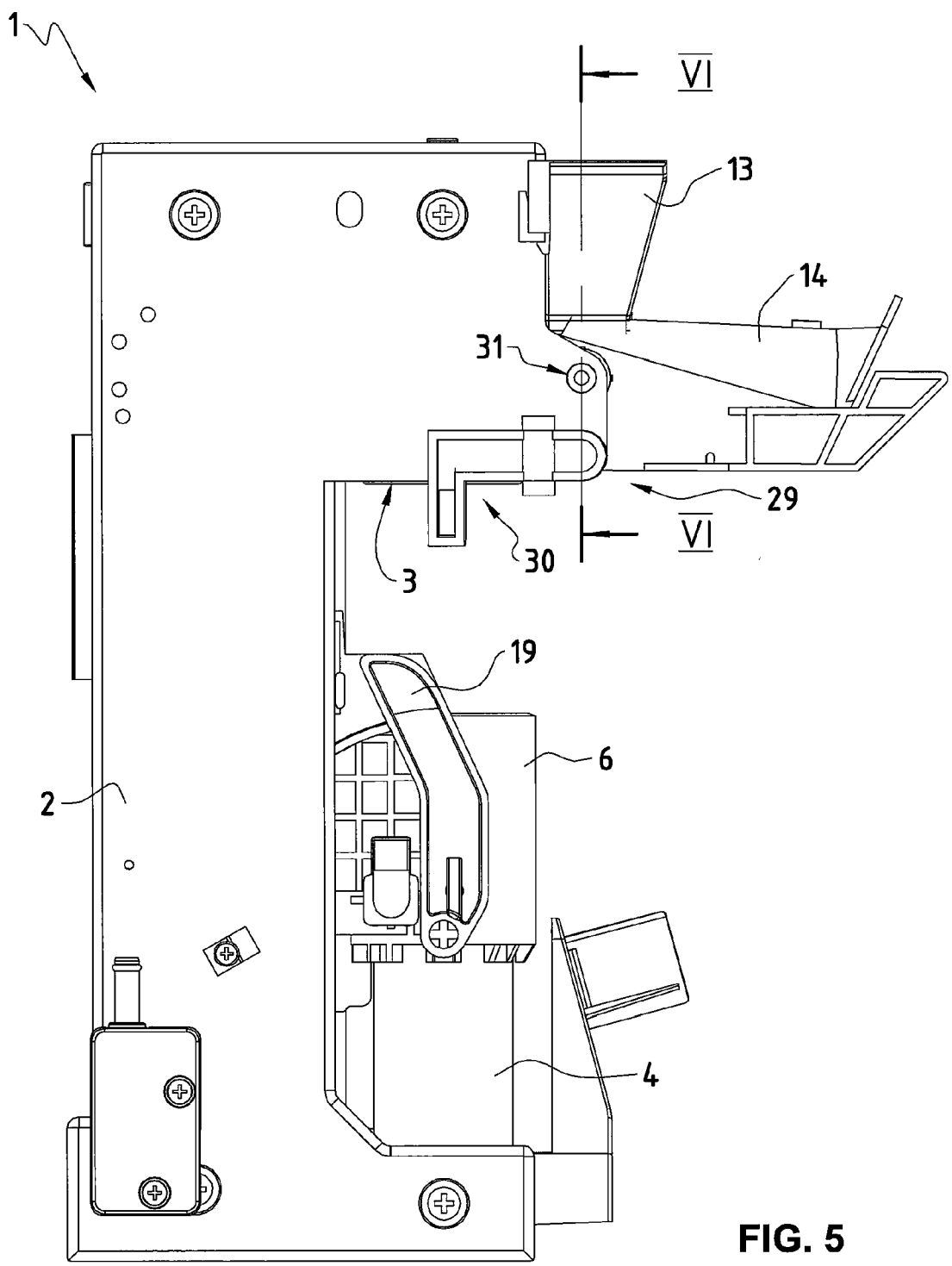
FIG. 5 shows a lateral view of the brewing facility with the swivel-type funnel being fully swiveled-out.

As is shown in FIG. 5, said swivel-type funnel 14 can be brought into a fully swiveled-out position, in which it is held by locking means 29, for the cleaning process of the brewing facility. With the swivel-type funnel 14 being in said fully swiveled-out position, the accessibility of the upper plunger 3 is good and cleaning, in particular, of the screen sealing the upper plunger 3 is ensured. After the cleaning process is complete, the locking means 29 can be unlocked by means of unlocking means 30, the swivel-type funnel is swiveled back into the filling position shown in FIG. 1. For this purpose, the swivel-type funnel 14 is held in the frame 2 by means of bolts 31 such that it can swivel.

Figure 6:
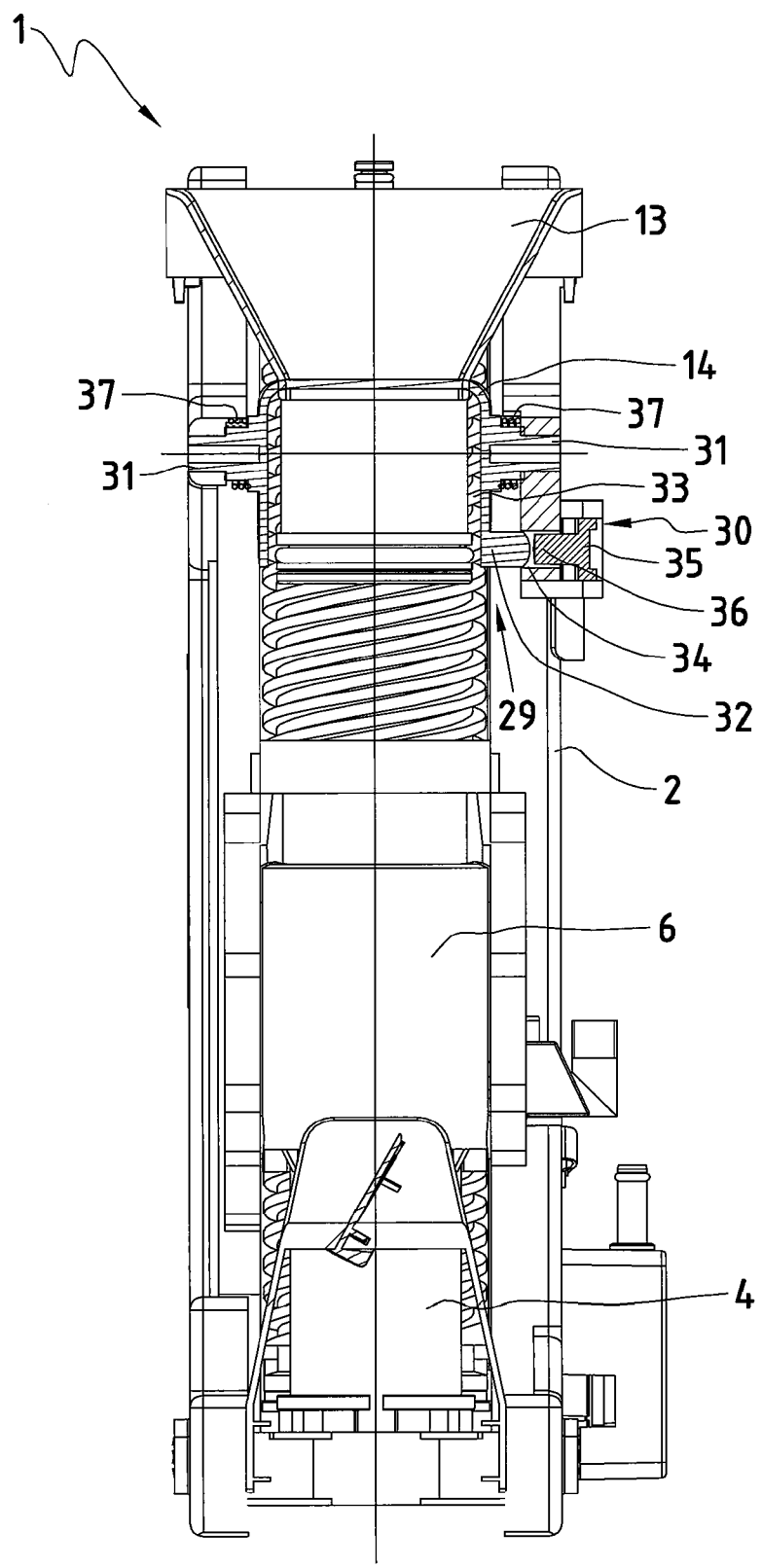
FIG. 6 shows a sectional view of the brewing facility along the line, VI-VI, according to FIG. 5.

The sectional view according to FIG. 6 evidences how the swivel-type funnel 14 is supported, such that it can swivel, by the bolts 31 in the frame 2 of the brewing facility 1. The locking means 29 comprise a cam 32 that is attached on the wall 33 of the swivel-type funnel 14. In the fully swiveled-out position of the swivel-type funnel 14 shown in FIG. 5 and correspondingly in FIG. 6, the cam 32 latches into a recess 34 that is attached on the frame 2. Said cam 32 being engaged in the recess 34 holds the swivel-type funnel 14 in the fully swiveled-out position.

The unlocking means 30 can be used to unlock the locking of the swivel-type funnel 14. For this purpose, said unlocking means 30 are provided in the form of a lever 35 that is held on frame 2 such that it can swivel, as shall be described below, and has a projection 36 that projects into the recess 34 attached on its swivel-type end-region. For unlocking, the lever 35 is swiveled such that the projection 36 is pushed further into the recess 34; accordingly, the cam 32 is pushed out of the recess 34 by elastic recession of the wall 33, and the swivel-type funnel 14, which is in the fully swiveled-out position, is swiveled back towards the filling position by the spring force of two helical springs 37.

Figure 7:
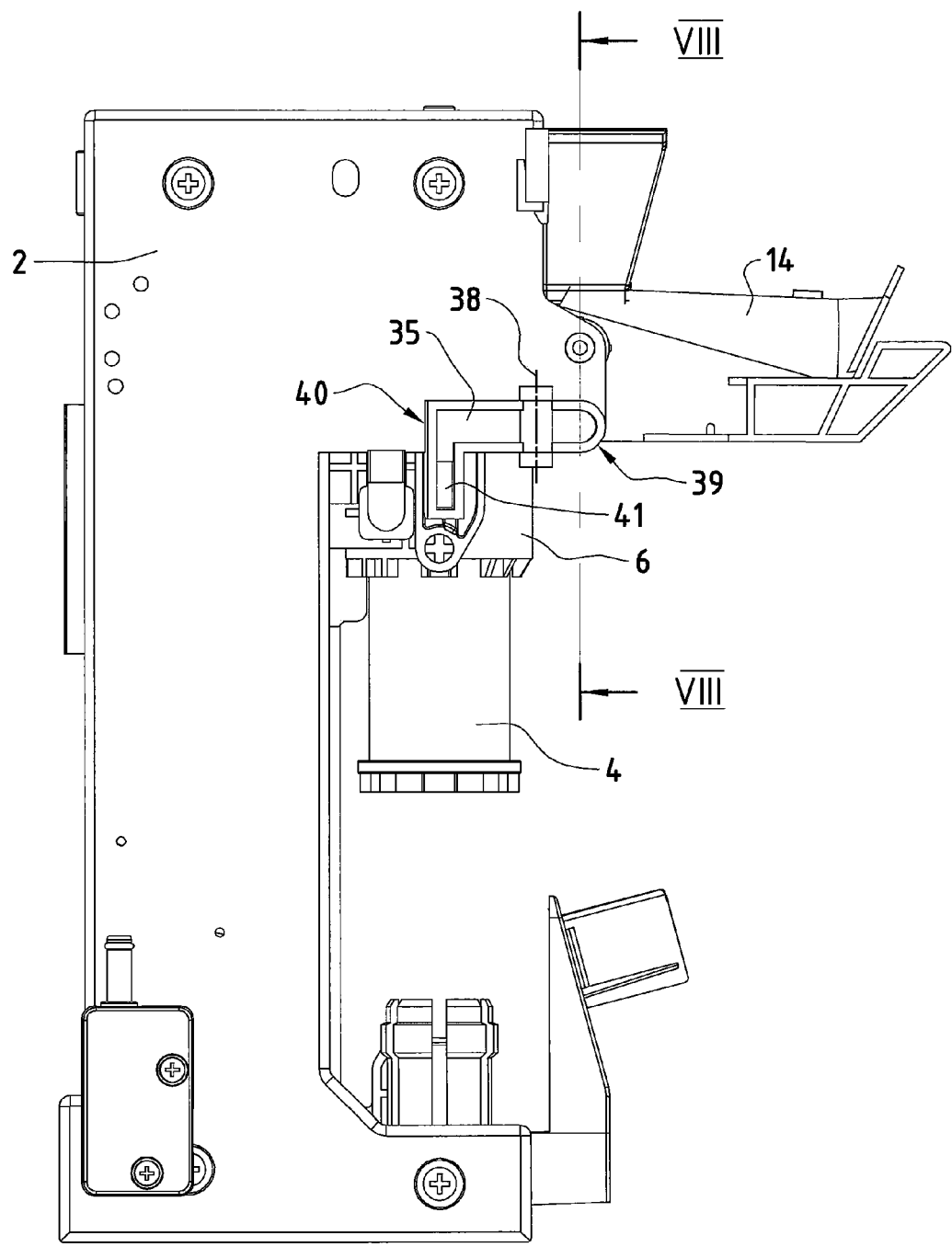
FIG. 7 shows a lateral view of the brewing facility with the swivel-type funnel being fully swiveled-out and the brewing cylinder driven up.

As is evident from FIG. 7, the lever 35 is held on the frame 2 such that it can rotate about the axis 38. The projection 36 that is not shown (FIG. 6) is attached on one of the swivel-type end-regions 39 thereof. The other end-region 40 is equipped as user element 41. The unlocking process described above can be conducted by hand-actuated swiveling of the lever 35.

Figure 8:
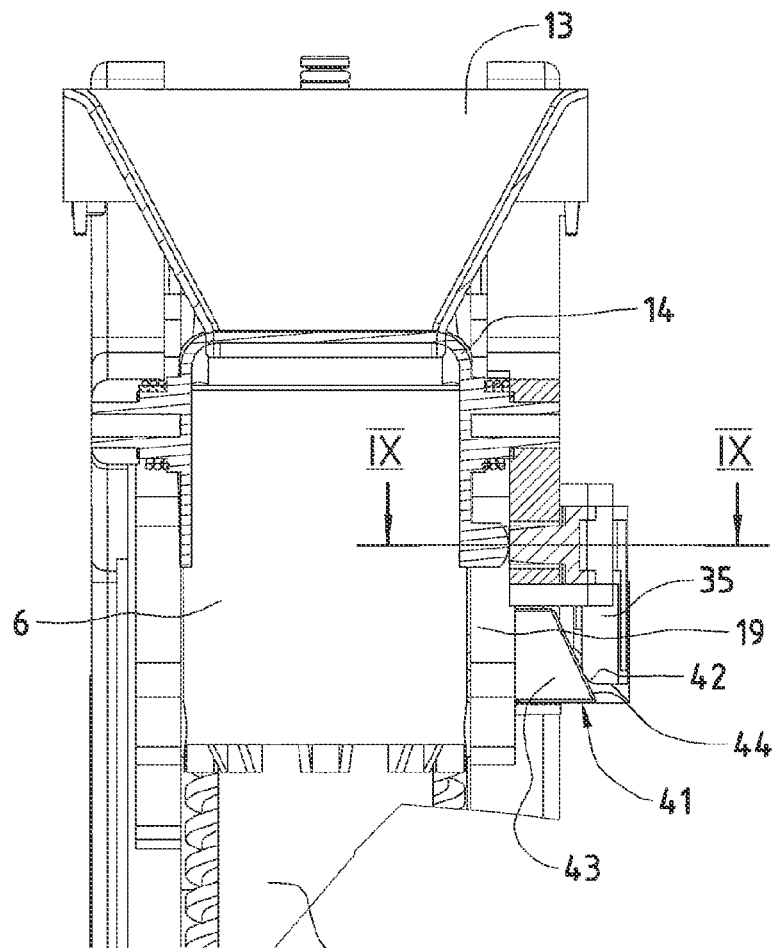
FIG. 8 shows a sectional view of the upper region of the brewing facility along the line, VIII-VIII, according to FIG. 7.
Figure 9:
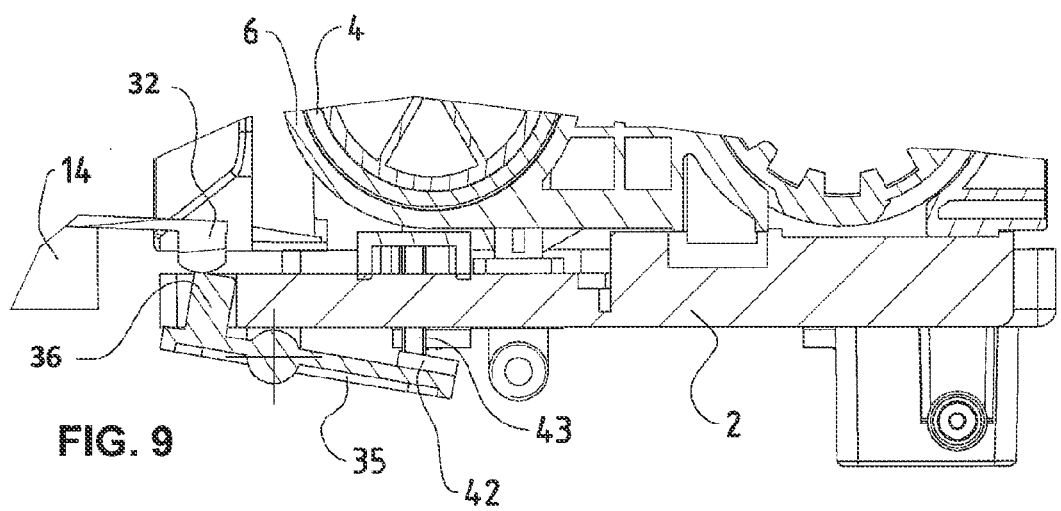
FIG. 9 shows a partial sectional view of the brewing facility along the line, IX-IX, according to FIG. 8.

As is particularly evident from FIGS. 8 and 9, the unlocking means are actuated upon the brewing cylinder 6 being driven upwards along with the lower plunger 4, which position is evident from FIG. 7. For this purpose, a radial cam 41 is attached on the brewing cylinder 6 and acts in concert with a peripheral cam 42 that is attached on lever 35. The radial cam 41 consists of a fin 43 that is formed onto the lower region of the stripping element 19, which in turn is hinged on the brewing cylinder 6. The fin 43 is equipped with an inclined surface 44 which, upon the brewing cylinder 6 being driven upwards jointly with the stripping element 19, has the effect that the lever 35 is swiveled away and the swivel-type funnel 14 is unlocked.

Figure 10:
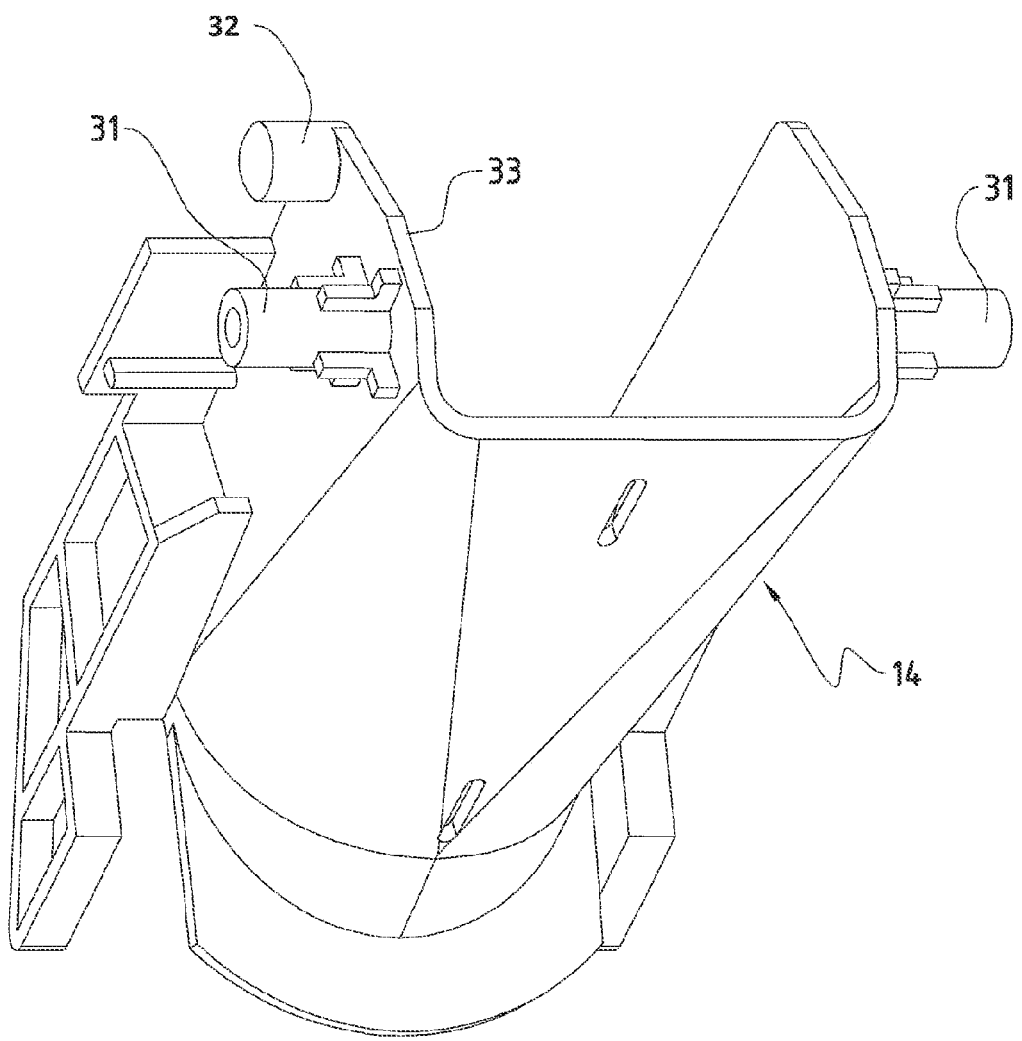
FIG. 10 shows a spatial view of the swivel-type funnel.

FIG. 10 shows a spatial view of the swivel-type funnel 14. The bolts 31 are attached to same and are used to hold the swivel-type funnel 14 in the frame 2 of the brewing facility such that it can be rotated. On one side of the swivel-type funnel 14, the cam 32 is attached on the wall 33, at a distance from bolt 31. The swivel-type funnel 14 is made of an elastic plastic material such that the wall being relatively thin results in the cam 32 being held by spring action with respect to the bolt 31 by the wall 3 serving as a laminated spring in this region. This pre-tensions the cam 32 elastically in the non-locked state such that it proceeds into recess 34 by itself once recess 34 is reached.

This solution is a simple means for achieving easy accessibility of the upper plunger of the brewing facility for cleaning purposes.

The invention claimed is:

1. Brewing facility for a coffee machine, comprising
a brewing cylinder with a cylindrical bore hole and an upper plunger and a lower plunger by means of which the brewing cylinder is sealed to form a brewing chamber, when the brewing cylinder and the plungers are in a first position, whereby the brewing cylinder and the plungers are held in a frame such that they are movable with respect to each other, and are driven by means of a driving facility, wherein said driving facility comprises a spindle whose ends on either side are supported in the frame such that they can rotate,
a catching part that is attached on the brewing cylinder and is provided with a threaded part and, by means of the spindle, is shifted along linear guidances that are attached in the frame,
a coffee powder feed facility for filling coffee powder into the brewing chamber, which is provided with a swivel-type funnel, which is moveable against a spring force from a filling position into a swiveled-away position and vice versa, and
a stripping element for stripping off the coffee powder cake, which is ejected from the brewing chamber by the lower plunger after the brewing process, into a collecting container,
wherein the swivel-type funnel is moveable further from the swiveled-away position to a fully swiveled-out position and in that locking and unlocking means are provided at said fully swiveled-out position of said swivel-type funnel capable of locking or unlocking said swivel-type funnel in said fully swiveled-out position,
wherein the locking means are formed by a cam that is attached on the swivel-type funnel and, with the swivel-type funnel being in the fully swiveled-out position, said cam latches onto a recess that is attached on the frame and holds the swivel-type funnel in said fully swiveled-out position.

2. Brewing facility according to claim 1, wherein the unlocking means are provided by a lever that is attached to the frame in a swiveling fashion, and has, on its swivel-type end-region, a projection attached to it that projects into the recess and, upon appropriate swiveling, pushes the cam out of the recess and unlocks the swivel-type funnel.

3. Brewing facility according to claim 2 wherein a peripheral cam is attached to the lever and interacts with a radial cam that is attached on the drivable region of the brewing cylinder and swivels the lever by means of the peripheral cam while driving up the brewing cylinder, and unlocks the fully swiveled-out funnel.

4. Brewing facility according to claim 3, wherein the radial cam is provided in the form of a fin that is provided with a surface that is inclined with respect to the driving direction of the brewing cylinder, and which is attached on the stripping element.

5. Brewing facility according to claim 1, wherein the cam is formed on an elastically malleable part of a wall of the swivel-type funnel.

6. Brewing facility for a coffee machine, comprising
a brewing cylinder with a cylindrical bore hole and an upper plunger and a lower plunger by means of which the brewing cylinder is sealed to form a brewing chamber, when the brewing cylinder and the plungers are in a first position, whereby the brewing cylinder and the plungers are held in a frame such that they are movable with respect to each other, and are driven by means of a driving facility, wherein said driving facility comprises a spindle whose ends on either side are supported in the frame such that they can rotate, a catching part that is attached on the brewing cylinder and is provided with a threaded part and, by means of the spindle, is shifted along linear guidances that are attached in the frame, a coffee powder feed facility for filling coffee powder into the brewing chamber, which is provided with a swivel-type funnel, which is moveable against a spring force from a filling position into a swiveled-away position and vice versa, and a stripping element for stripping off the coffee powder cake, which is ejected from the brewing chamber by the lower plunger after the brewing process, into a collecting container, wherein the swivel-type funnel is moveable further from the swiveled-away position to a fully swiveled-out position and in that locking and unlocking means are provided at said fully swiveled-out position of said swivel-type funnel capable of locking or unlocking said swivel-type funnel in said fully swiveled-out position, wherein the locking means are formed by a cam that is attached on the swivel-type funnel and, with the swivel-type funnel being in the fully swiveled-out position, said cam latches onto a recess that is attached on the frame and holds the swivel-type funnel in said fully swiveled-out position, wherein the unlocking means are provided by a lever that is attached to the frame in a swiveling fashion, and has, on its swivel-type end-region, a projection attached to it that projects into the recess and, upon appropriate swiveling, pushes the cam out of the recess and unlocks the swivel-type funnel, and wherein a peripheral cam is attached to the lever and interacts with a radial cam that is attached on the drivable region of the brewing cylinder and swivels the lever by means of the peripheral cam while driving up the brewing cylinder, and unlocks the fully swiveled-out funnel.

7. Brewing facility according to claim 6, wherein the radial cam is provided in the form of a fin that is provided with a surface that is inclined with respect to the driving direction of the brewing cylinder, and which is attached on the stripping element.

* * * * *